United States Patent [19]

Cason et al.

[11] Patent Number: 4,609,517
[45] Date of Patent: Sep. 2, 1986

[54] SHEET FLATTENING METHOD

[75] Inventors: Gary D. Cason, Plano; John E. Dobson, Dallas; Francis P. Gunter, Plano, all of Tex.; Svetislav Mitrovich, Spokane, Wash.; Suresh C. Paranjpe, Dallas, Tex.

[73] Assignee: The Mead Corporation, Dayton, Ohio

[21] Appl. No.: 643,211

[22] Filed: Aug. 22, 1984

[51] Int. Cl.[4] .............................................. B29C 55/18
[52] U.S. Cl. .................................... 264/291; 162/197; 162/271; 264/280; 264/322
[58] Field of Search .................... 264/290.2, 280, 291, 264/322, 345; 162/271, 197

[56] References Cited

U.S. PATENT DOCUMENTS

| | | | |
|---|---|---|---|
| 1,560,670 | 11/1925 | DeVries | 162/271 |
| 1,862,749 | 6/1932 | Hill et al. | 427/173 |
| 1,870,626 | 8/1932 | Hopkins | 162/271 |
| 1,880,451 | 10/1932 | Hopkins | 162/197 |
| 1,969,073 | 8/1934 | Hamre | 92/70 |
| 2,012,953 | 9/1935 | Brunner et al. | 92/70 |
| 2,946,087 | 7/1960 | Haroldson et al. | 264/280 |
| 3,104,445 | 9/1963 | Wilford | 162/271 |
| 3,161,563 | 12/1964 | Walker et al. | 162/197 |
| 3,344,493 | 10/1967 | Telgheider | 162/271 |
| 3,471,363 | 10/1969 | Schmidt | 162/197 |
| 3,799,038 | 3/1974 | Bossons et al. | 162/197 |
| 4,013,284 | 3/1977 | Demetre | 271/183 |
| 4,113,827 | 9/1978 | Stoller | 264/280 |
| 4,119,309 | 10/1978 | Mayer et al. | 271/183 |

FOREIGN PATENT DOCUMENTS 36015   9/1972   Japan .................................. 264/280

Primary Examiner—James Lowe
Attorney, Agent, or Firm—Biebel, French & Nauman

[57] ABSTRACT

A method and apparatus for flattening curled ones of a plurality of moving paper sheets subsequent to the printing and at least partial drying thereof is disclosed. The sheets are transported sequentially along a transport path, and the selected sheets are heated to a plasticizing temperature. The selected sheets are then stretched in both a longitudinal and a lateral direction with respect to the transport direction of the sheets.

2 Claims, 13 Drawing Figures

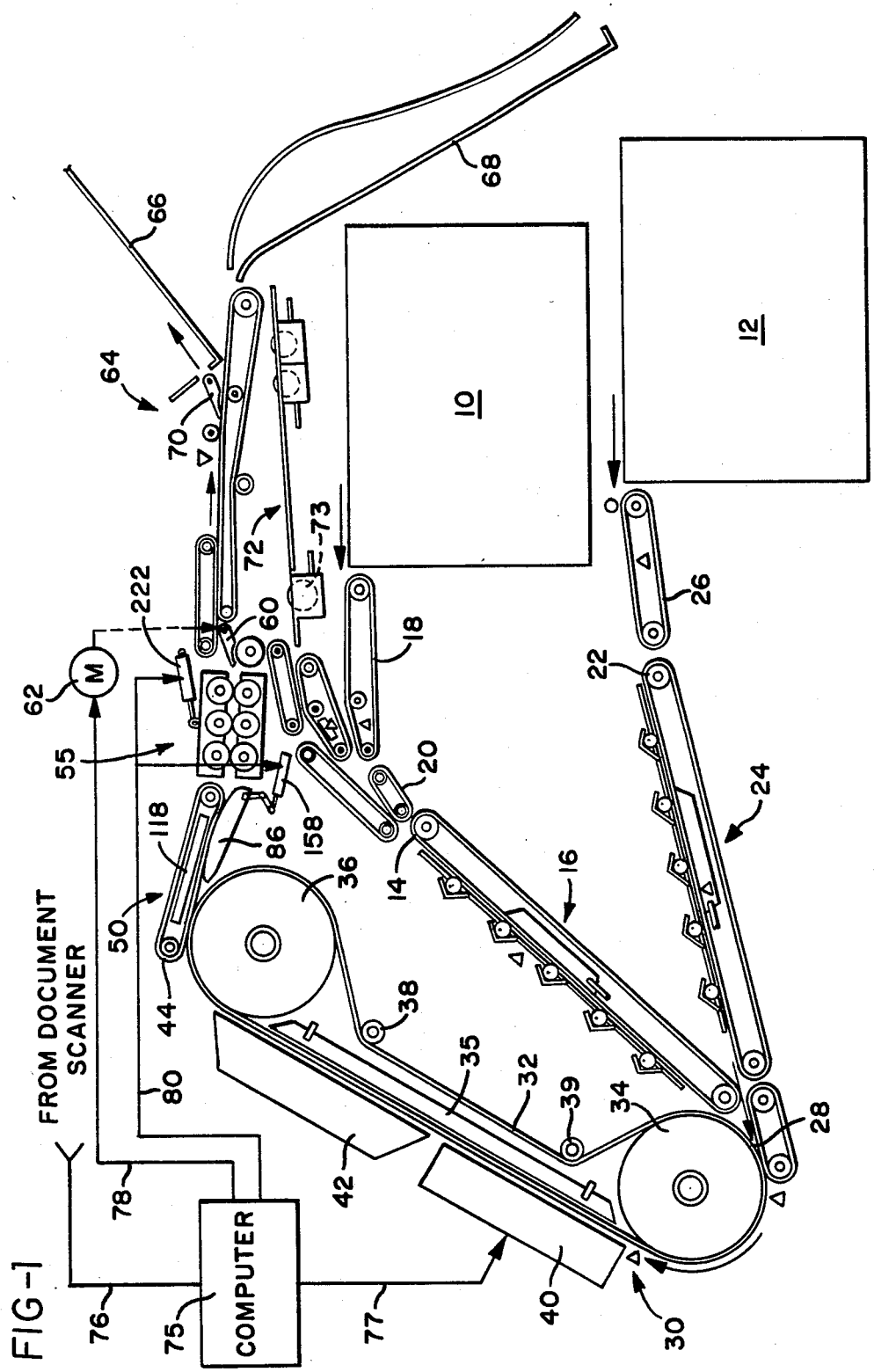

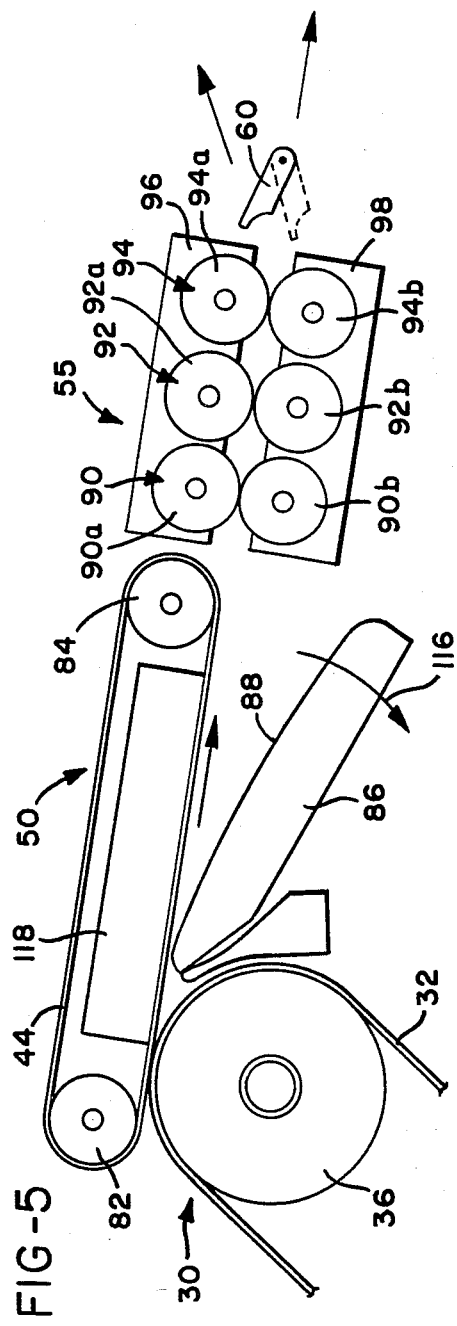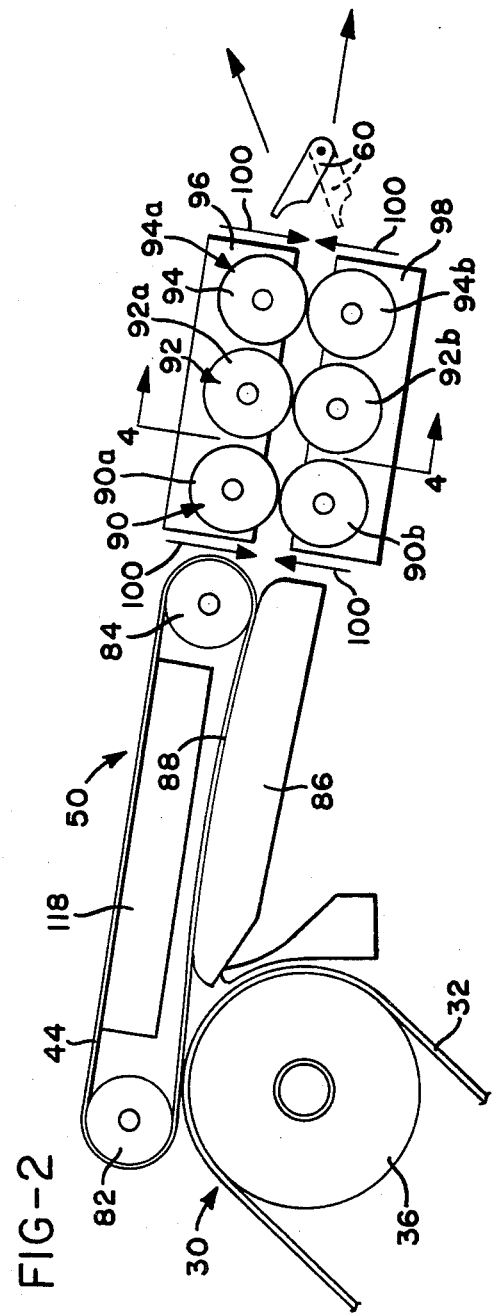

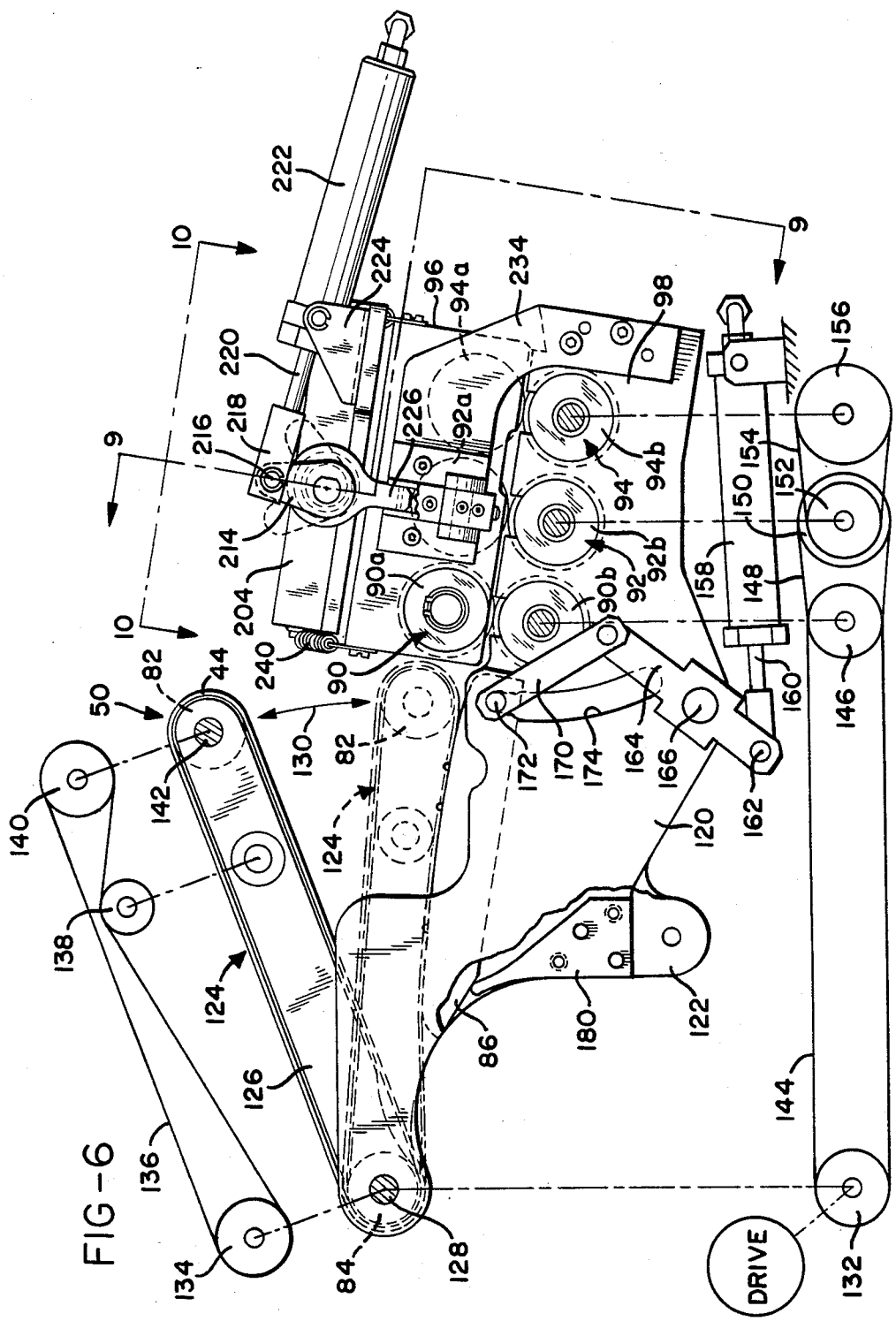

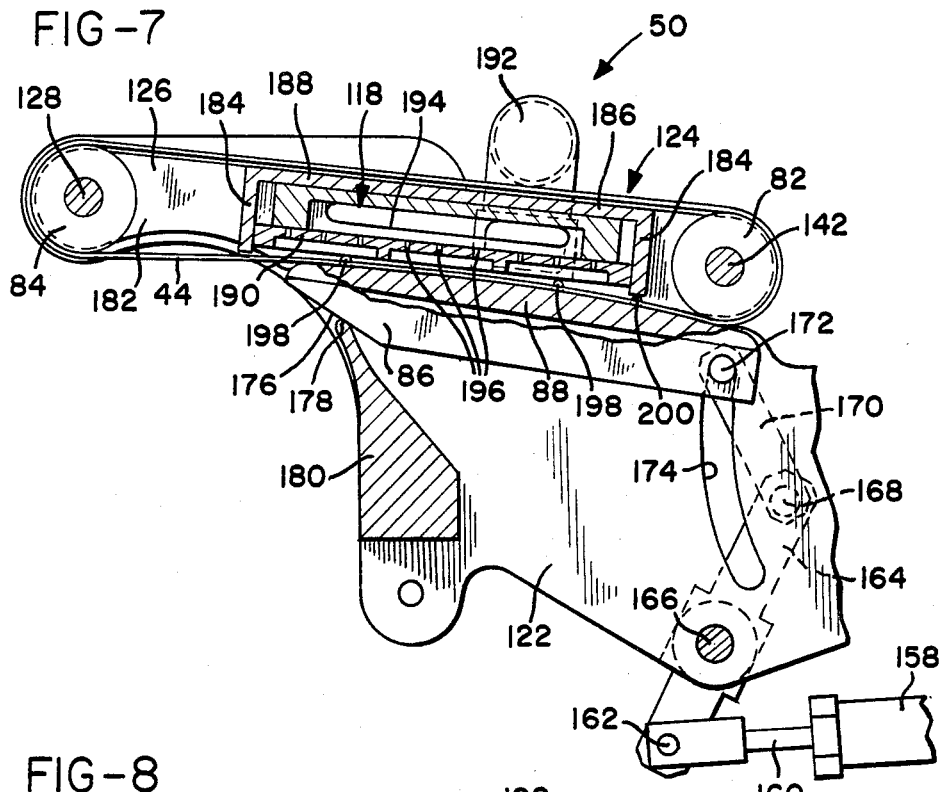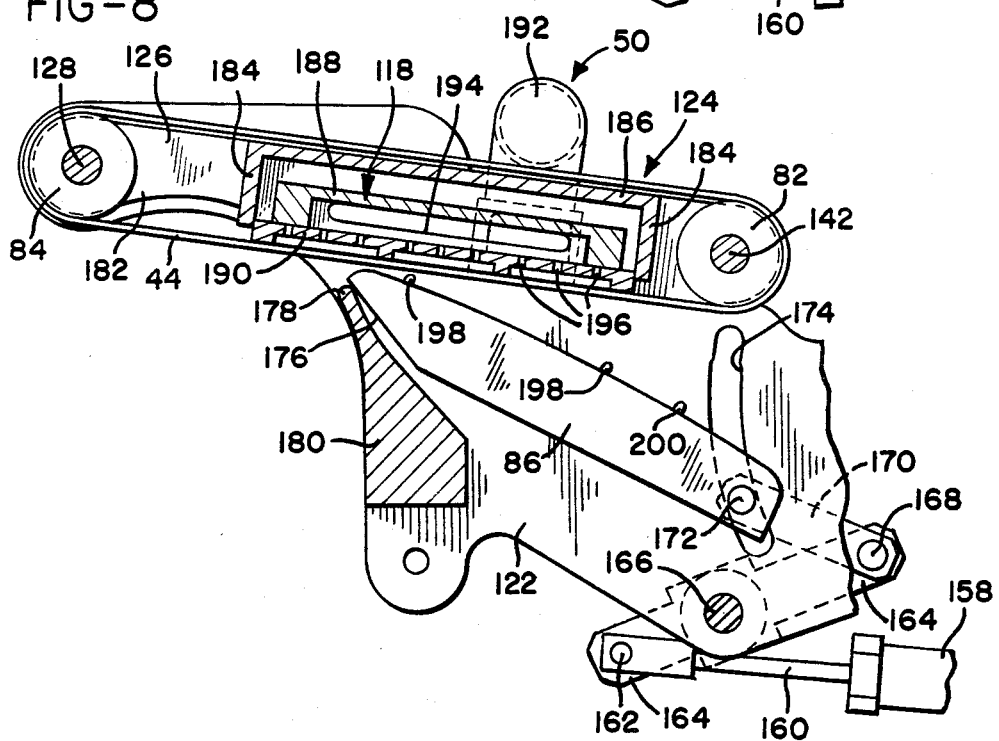

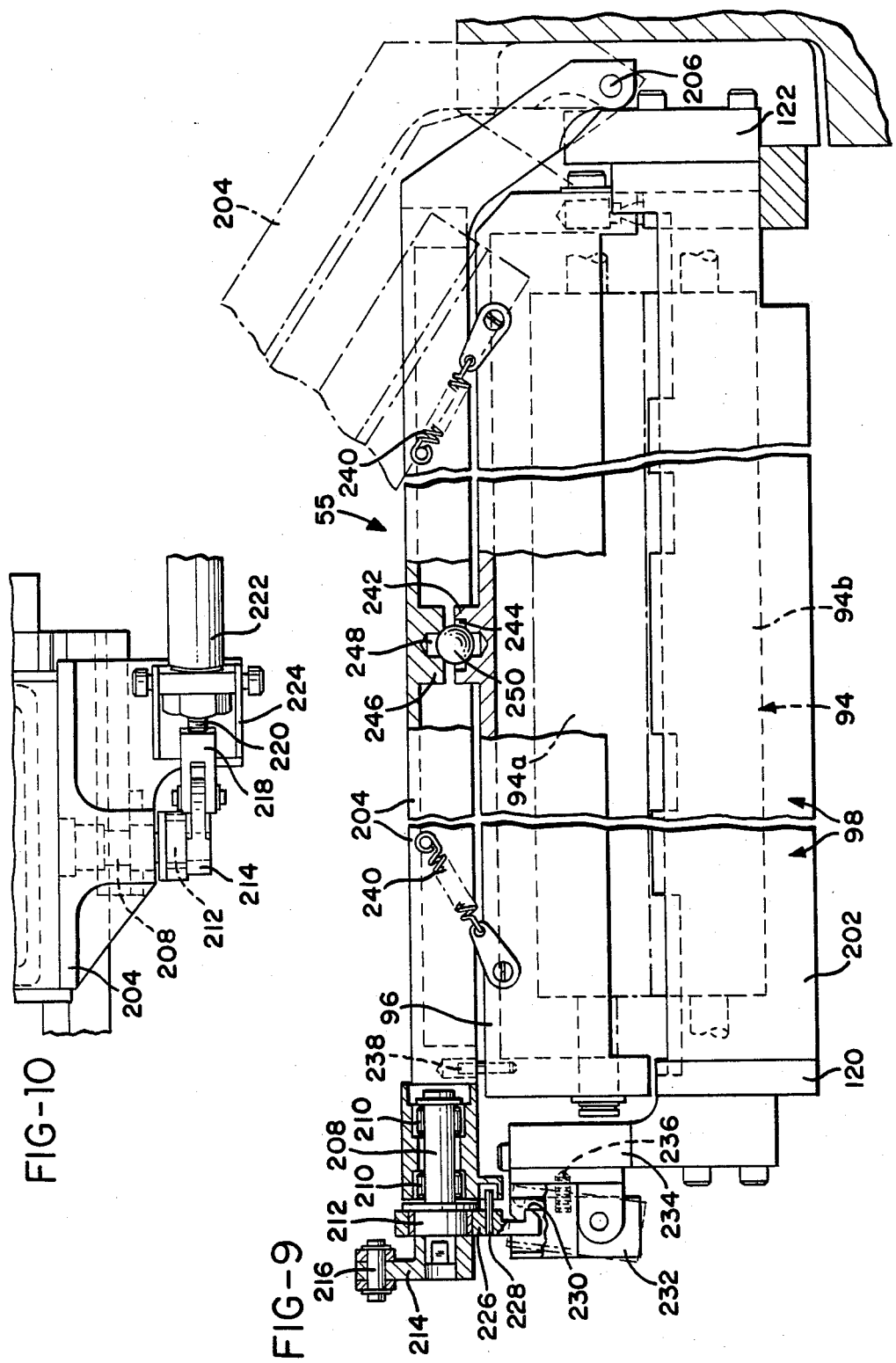

SHEET FLATTENING METHOD

BACKGROUND OF THE INVENTION

The present invention relates generally to a sheet flattening method and apparatus for flattening of a paper sheet which has been printed with a liquid ink. More particularly, the sheet flattener is configured for use as a portion of a printing system, such as a duplicator, which may also include unprinted sheet storage bins, an ink jet printer, drying apparatus, and the like, along with means for transporting the sheets through the duplicator.

Certain duplicators utilize a water-base ink for printing sheets of paper. One example of such a duplicator is shown in co-pending U.S. application Ser. No. 355,799, filed Mar. 8, 1982, now U.S. Pat. No. 4,413,265 in which an ink jet printer is used. The liquid ink is deposited upon the paper sheet in droplets, which are subsequently dried as the sheet is moved through an appropriate drying apparatus.

On average, a sheet is printed in a duplicator with approximately 9–10% of the sheet area being covered by the printing ink. In instances where the proportion of printed area to sheet area is significantly higher than normal, the sheet tends to curl toward the printed side of the sheet as the ink dries. A similar situation can exist where smaller areas on the sheet are particularly heavily printed. The radius of curvature produced by this curl may be as severe as 1" (2.5 cm).

Such curling of heavily printed sheets detracts from the appearance and interferes with the stacking of completed copies. More importantly, after printing, these sheets are carried by transport apparatus through the remainder of the printing system and/or any subsequent finishing apparatus. The curling can result in portions of the sheets, and particularly their leading edges, being carried outside of the normal transport path. This in turn can lead to the sheets being inadvertently deflected from the transport path, jamming the transport apparatus or damaging the sheets.

What is needed, therefore, is an apparatus and method which may be incorporated into a duplicator or other printing system to flatten and recondition heavily printed sheets which have become curled by the printing process.

SUMMARY OF THE INVENTION

In response to the foregoing need, the present invention provides an apparatus and method for operating upon a moving single paper sheet for removing the curling of the sheet subsequent to the printing and drying thereof. The apparatus includes sheet transport means and a heater disposed for movement of the sheet therepast by the transport means. Means are provided for applying a stretching force to the transported sheet in a direction substantially parallel to the direction of movement thereof, along with means for applying a stretching force to the transported sheet in a substantially lateral direction.

The parallel and lateral stretching means may be disposed remotely from the heater, in which case the transport means directs the sheet from movement past the heater to the parallel and lateral stretching means. The heater may include a convex surface and at least one heating element for heating the surface, with the transport means including a belt disposed against the convex surface for movement of the sheet along the surface by the belt.

The parallel stretching means may include a plurality of pairs of oppositely driven rollers, the rollers of each pair being disposed in mutual contact for movement of the sheet therebetween, the roller pairs being disposed for passage of the sheet from an initial one of the pairs to succeeding ones of the pairs. The rollers are driven so that each of the pairs is driven at a rotational speed greater than that of the immediately preceding pair. The transport means directs the sheet from movement past the heater to the initial roller pair.

The lateral stretching means may include at least one pair of oppositely-driven rollers, the rollers of the pair being disposed in mutual contact for movement of the sheet therebetween along a sheet path. Each of the rollers defines on its surface a plurality of annular grooves, each of the grooves having a pair of side walls with at least one of the walls being formed on a bevel directed away from substantially the portion of the roller corresponding to the center of the sheet path. The grooves serve to generate a lateral tension within the sheet, and the transport means directs the sheet from movement past the heater to the second roller pair.

The apparatus may be adapted for operating upon selected ones of a plurality of moving paper sheets for flattening and reconditioning selected sheets subsequent to the printing and drying thereof. In such a case, the apparatus includes sheet transport means for transporting the sheets sequentially along a transport path and a heater. Means for selectively moving the heater from a first position remote from the transport path to a second position adjacent the path is provided so that the sheet transport means moves the sheets past the heater. Thus, heat is applied to the selected sheets to cause plasticizing thereof in preparation for stretching by the parallel and lateral stretching means described above.

Accordingly, it is an object of the present invention to provide a method and apparatus that will flatten and recondition a paper sheet subsequent to the printing thereof; to provide such a method and apparatus that can be added as a component to a complete duplicator system; and to provide such a method and apparatus that may be selectively applied only to those sheets which are likely to be curled.

Other objects and advantages of the present invention will be apparent from the following description, the accompanying drawings, and the appended claims.

BRIEF DESCRIPTION OF THE DRAWINGS

FIG. 1 is a schematic diagram illustrating a printing apparatus with which the present invention may be used;

FIG. 2 is a schematic illustration showing the apparatus of the present invention in an actuated position for flattening of printed sheets;

FIG. 5 is a view similar to FIG. 2 showing the flattening apparatus in its deactuated position;

FIG. 6 is a side view of the flattening apparatus of the present invention;

FIG. 7 is a side view of the heating station of the flattening apparatus, showing one side frame cut away and the heater in an actuated position;

FIG. 8 is a view similar to FIG. 7, showing the heating station in a deactuated position;

FIG. 9 is a view taken generally along line 9—9 of FIG. 6; and

FIG. 10 is a view taken generally along line 10—10 of FIG. 6.

DETAILED DESCRIPTION OF THE PREFERRED EMBODIMENTS

Figure 3A:
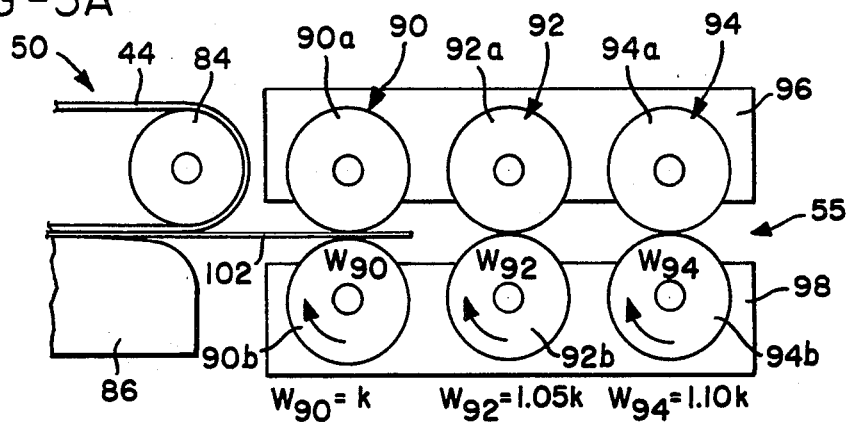
FIGS. 3A, 3B and 3C are schematic diagrams showing the operation of the longitudinal stretching means.

The apparatus of the present invention for operating upon a paper sheet for flattening a curled sheet subsequent to the printing thereon with a liquid ink may be incorporated within a general sheet printing station such as that shown in FIG. 1. Sheets to be printed may be supplied by one or both of paper storage trays 10 or 12. Sheets of paper from sheet storage tray 10 are supplied to the receiving end 14 of a sheet registration device 16 by belt transports 18 and 20, while sheets from sheet storage tray 12 are transported to the receiving end 22 of a sheet registration device 24 by belt transport 26. The sheets are shifted laterally as they are transported through registration devices 16 and 24, to provide proper lateral alignment prior to delivery of the sheets to a common receiving point 28 at the lower end of an upwardly inclined transport means 30. A preferred configuration for registration devices 16 and 24 is described in detail in U.S. Pat. No. 4,440,389 issued Apr. 13, 1984 to Ames et al.

Transport means 30 includes a set of vacuum belts 32, a vacuum drum 34, a vacuum plenum 35, a guide roller 36 and backing rollers 38 and 39, all arranged as illustrated. Transport means 30 carries the sheets along a path which is preferably inclined upwardly about 60° from the horizontal. The sheets are carried on the belts 32 past a print module 40, which includes a plurality of print heads (not shown). Detailed examples of appropriate print heads may be found in U.S. Pat. No. 4,413,265 issued Nov. 1, 1983 to Kockler et al.

After being printed, the sheets are carried on belts 32 past a drying station 42 which dries the ink printed on the sheets by directing, for example, heated air or infrared or microwave radiation against the sheets moving therepast.

Upon reaching the uppermost portion of transport means 30, the sheets are passed to and carried by belts 44 which move the sheets past a heating station 50. Sheets are next passed to conditioning station 55 which applies stretching forces to the sheets in directions both parallel and lateral to the direction of movement of the sheets. Heating station 50 and conditioning station 55 represent two of the primary components of the flattening apparatus of the present invention.

Upon exiting conditioning station 55, the sheets may be directed by a gate 60, which may be selectively operated by a motor 62, to an output transport 64. The transport 64 carries the sheets to an output sample tray 66 or, alternatively, to an accumlator tray 68. Gate 70 deflects the sheets into tray 66 when pivoted into the position shown in FIG. 1.

As an alternative to direction to output transport 64, sheets may be directed past gate 60 into inverting tray 72. Sheets which are delivered to inverting tray 72 are directed toward registration device 16, which returns the sheets to print module 40 for reverse side printing. A vacuum roller 73 is provided for removing sheets from inverting tray 72 and directing them toward registration device 16.

A computer 75 is provided for controlling various operations within the printing apparatus. Signals are fed into computer 75 along line 76 from a document scanner (not shown) which scans original documents corresponding to the sheets to be printed. The computer 75 then controls print module 40 as indicated by line 77, to provide for proper placement of ink upon the sheets moving therepast. As indicated by line 78, computer 75 also controls motor 62 to direct sheets from conditioning station 55 to their appropriate destination, depending upon whether the sheets are to be printed on a single side only, have been printed on one side but require printing on the reverse side, or have been printed on both sides of the sheet. Finally, as indicated by line 80, computer 75 also controls apparatus within heating station 50 and conditioning station 55, as will be described in detail below, so that the flattening apparatus may be operative only upon those sheets which are likely to be curled. Suitable control signals can be generated, for example, as a function of percentage of printed area.

The overall design and general operation of the flattening apparatus is shown schematically in FIG. 2. Sheets are delivered by belts 32 from transport means 30 to the heating station 50. Belts 44, which extend about rollers 82 and 84, are driven to take sheets from drum 36 and carry them across heater 86. Heater 86 is provided with a convex upper surface 88, so that as the sheets are carried across surface 88 by belts 44, the sheets remain in close contact with surface 88 and belts 44. Surface 88 is preferably constructed of a metallic material to facilitate heat transfer.

Heater 86 includes at least one heating element (not shown) mounted within the heater interior to maintain surface 88 at a temperature preferably within the range of 365° F. to 375° F. (185° C. to 190° C.). This effectively plasticizes the sheets which have been printed upon by a liquid ink at print module 40 and at least partially dried by movement through drying station 42. Drying station 42 is regulated so that when the sheets are delivered to heater 86 they have a moisture content preferably of about 5-10%. Since the ambient moistue level of the sheet is approximately 4%, the sheets are effectively delivered to heater 86 with about 1-6% additional moisture resulting from the ink.

After passage over surface 88 of heater 86, the sheets are heated to a temperature of approximately 220° F. (104° C.) and are delivered to conditioning station 55. Station 55 includes three pairs of driven rollers 90, 92 and 94, with the upper rollers 90a, 92a and 94a of each roller pair being carried within an upper frame 96, and the lower rollers 90b, 92b, and 94b of each roller pair being carried in a lower frame 98. Frames 96 and 98 are connected by means, to be described in detail below, that is operative to selectively draw frames 96 and 98 together, as indicated by arrows 100. Thus, the pressure exerted by roller pairs 90, 92 and 94 upon the individual rollers of the pairs and hence the sheets passing therebetween may be regulated. In the diagram of FIG. 2, the rollers of each pair 90, 92 and 94 exert a preferred pressure of 18 to 20 psi on the sheets.

The purpose of conditioning station 55 is to exert upon the heated sheets stretching forces which are applied in directions both parallel to and lateral to the direction of movement of the sheets. Thus, as any remaining moisture above the ambient content is dried, the paper fibers are stretched to counteract any shinking tendencies.

Figure 3B:
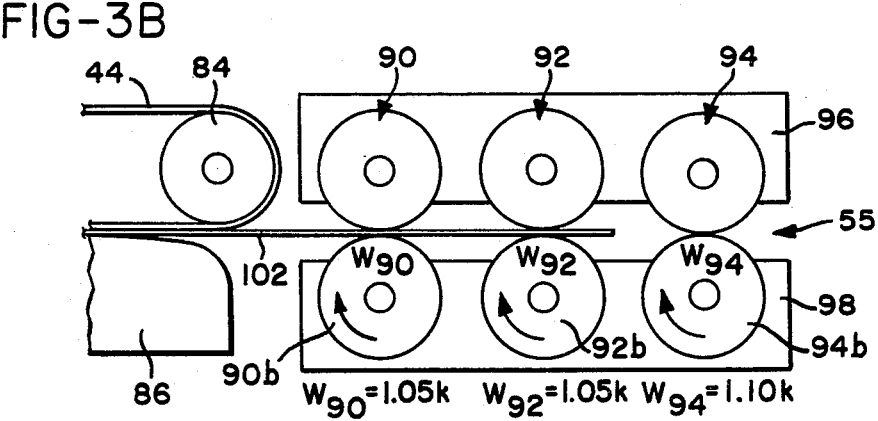
Figure 3C:
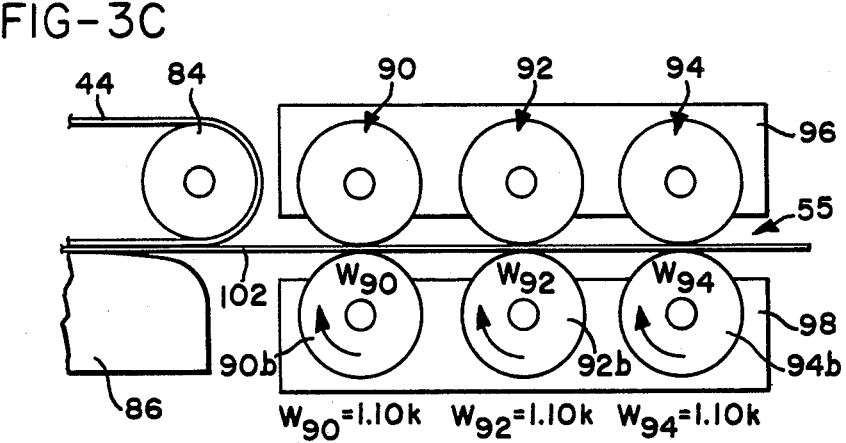

The means for stretching a sheet in the direction parallel to the movement of the sheet within conditioning station 55 may be seen by reference to FIGS. 3A–3C. Each of roller pairs 90, 92 and 94 are driven at rotational speeds of $W_{90}$, $W_{92}$ and $W_{94}$, respectively. Roller pair 90 is driven at some speed $W_{90}=K$, with the succeeding roller pairs 92 and 94 being driven at slightly greater speeds; in particular, roller pair 92 is driven at 1.05K while roller pair 94 is driven at 1.10K. In addition, roller pairs 90 and 92 are each fitted with one-way clutches (not shown), so that these pairs may be moved at rotational speeds greater than their driven speeds. The clutches may be any appropriate commercially-available clutch assembly, such as those of the roller bearing type.

As seen in FIG. 3A, a single sheet 102 exits heating station 50, driven by belts 44. The sheet enters roller pair 90 of conditioning station 55, which is driven at a rotational speed $W_{90}=K$, which also corresponds to the speed at which sheet 102 has been driven through heating station 50.

In FIG. 3B, sheet 102 enters between roller pair 92. Pair 92 is driven at a rotational speed of $W_{92}=1.05K$, so that sheet 102 is stretched in a parallel direction. Roller pair 90, as a result of sheet 102 entering between roller pair 92, is rotated at a speed greater than its driven speed of $W_{90}=1.05K$. Sheet 102 is still partially within heating station 50, however, and thus the friction on sheet 102 by belts 44 provides the necessary resistive load to maintain tension within sheet 102 in the parallel direction.

In FIG. 3C, sheet 102 has been moved between roller pair 94. Thus, tension is maintained within sheet 102 since roller pair 94 is driven at a speed of $W_{94}=1.10K$. Due to the one-way clutches associated with roller pairs 90 and 92, these pairs are also rotated at a speed of 1.10K.

Figure 4:
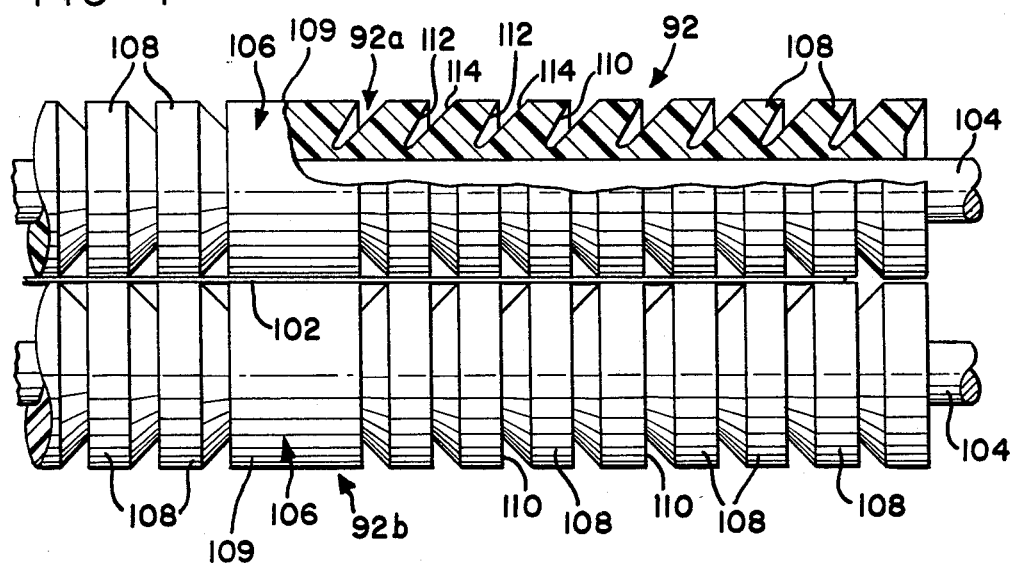
FIG. 4 is a side view showing a roller pair for stretching sheets in a lateral direction, with a portion of one roller cut away.

The preferred means for laterally stretching the moving sheets may be seen by reference to FIG. 4. Roller pair 92 is shown in detail, with the understanding that roller pairs 90 and 94 are substantially identical. Each roller 92a and 92b of the roller pair 92 is molded from a resilient material, preferably an ethylene propylene material, and is carried upon a shaft 104. Each roller 92a and 92b includes a body 106 molded as a single piece, but giving the appearance of being formed of a plurality of elements 108 extending in either direction from a center member 109. Elements 108 are defined by a plurality of annular grooves 110, with each of the grooves 110 having side walls 112 and 114 formed on a bevel directed away from the center member 109 of the roller body 106.

The lateral stretching means further includes apparatus, to be described in detail below, that is operative to draw frames 96 and 98 supporting the rollers of roller pairs 90, 92 and 94 together. Thus, the rollers of each pair exert a compressive force upon each other at the point through which the sheets pass.

Figure 4A:
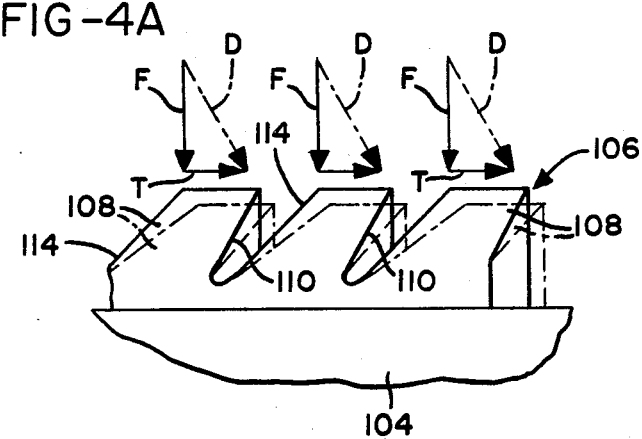
FIG. 4A is an enlarged schematic representation of a portion of a roller of FIG. 4, showing it operation to produce lateral stretching forces.

As can be seen in FIG. 4A, showing an enlarged section of a roller body 106, the compressive force exerted by each roller of the roller pair upon the other is exerted upon the surface of elements 108 as indicated by vector F. Due to the bevelled configuration of side walls 112 and 114 of annular grooves 110, the compressive force results in a displacement of elements 108 in a direction indicated by vectors D. As a result, a lateral tension is produced in the sheets passing between the rollers of the pair, illustrated by the resultant vector T. The lateral force therefore extends from the center of each sheet towards its side edges. Thus, the grooved rollers effectively convert compressive force with lateral stretching forces.

It should be recognized that grooves 110 need not necessarily be formed in parallel or in the direction of the paper path to be effective. For example, roller pins 90, 92 and 94 could be provided with spiral grooves.

It has been found that, in general, if ink coverage of a sheet does not exceed a certain percentage of the total sheet area, preferably about 25%, no significant curling of the sheet will result. However, sheets printed on less than this overall area can tend to curl if local areas on the sheet are heavily covered. In any event, it is not necessary to subject every sheet that has been printed to heating within heating station 50 or conditioning within conditioning station 55. Thus, as seen in FIG. 5, heater 86 can be lowered away from belts 44 as indicated by arrow 116. To enable sheets to be carried along belts 44, a vacuum plenum 118 is lowered to a position immediately adjacent belts 44, so that sheets are held by the vacuum applied by plenum 118 against belts 44 for movement to conditioning station 55. Simultaneously, the drawing together of frame 96 and 98 to produce compressive forces between the rollers of each of roller pairs 90, 92 and 94 is relaxed so that the rollers exert a compressive force of only 3–5 psi upon each other. This force, while producing no significant lateral tension in moving sheets, is sufficient to move sheets through conditioning station 55.

Details of a preferred embodiment for the apparatus of the present invention is shown in FIG. 6. Only that portion of the sheet printing apparatus of FIG. 1, including heating station 50 and conditioning station 55 is shown. A forward side frame member 120 cooperates with a corresponding rear side frame 122. Side frame 122 is in turn mounted to the main frame (not shown) of the printing apparatus to support the heating and conditioning stations 50 and 55.

Heating station 50 includes a transport mechanism 124 that includes belts 44 supported for movement by rollers 82 and 84. Rollers 82 and 84 are in turn mounted within a supporting frame 126. The transport mechanism 124 is mounted between side frames 120 and 122 by rotatable mounting of shaft 128 carrying roller 84 between side frames 120 and 122. Thus, transport mechanism 124 is pivotal about shaft 28 as indicated by arrow 130. An appropriate mechanical stop means (not shown) is provided on either or both of side frames 120 and 122 to serve as a limit to downward pivoting movement of transport mechanism 124, as will be described below.

Rollers 82 and 84 are driven from the common printing apparatus drive system, with the drive input supplied to schematically indicated drive pulley 132. Shaft 128 and roller 84 are driven directly from pulley 132. A second drive pulley 134 is mounted concentrically with puller 132, and a drive belt 136 extends around pulley 134, over idler pulley 138, and around pulley 140 that is attached to shaft 142 carrying roller 82. Thus, in transport mechanism 124, both rollers 82 and 84 are driven for movement of belts 44.

The drive means for conditioning station 55 is also provided from main drive pulley 132. As again seen in FIG. 6, rollers 90a, 92a, and 94a of the roller pairs 90, 92, and 94 are carried within upper frame 96 as will be described in detail below. Rollers 90b, 92b, and 94b of each roller pair are carried between side frames 120 and 122, which serve as a portion of lower roller frame 98. Rollers 90b, 92b and 94b of each roller pair are driven from the drive system, so as to move sheets through conditioning station 55.

A belt 144 extends from around main drive pulley 132 to drive pulley 146 that is connected to roller 90b. Pulley 146 is in turn connected by belt 148 to pulley 150, which is of a larger diameter than pulley 146 so that roller 92b, to which pulley 150 is connected, is driven at a slightly greater rotational speed than roller 90b. Similarly, a pulley 152 is also connected to roller 92b, while belt 154 drivingly connects a pulley 156 connected to roller 94b with pulley 152. Pulley 156 is of a larger diameter than pulley 152, to produce a slightly greater driven speed for roller 94b. As has been noted, one-way clutches (not shown) are provided between pulleys 146, 150 and 152 and rollers 90b and 92b, so that as paper sheets pass between the three roller pairs, the pairs may be moved at rotational speeds greater than their driven speeds so that the rotational speeds of the three roller pairs are more nearly equal. (See also the description above relating to FIGS. 3A–3C.)

Heating station 50 is shown in greater detail in FIGS. 7 and 8. Turning first to FIG. 7, heating station 50 is shown in its activated position, with heater 86 raised so that paper sheets passing through heating station 50 will be carried across the convex upper surface 88 of heater 86.

Heater 86 is held within its raised position by a linkage mechanism connected to an air actuated cylinder 158 that is mounted to the main frame of the printing apparatus (mounting not shown). The actuator 160 of cylinder 158 is pivotally connected by a pin 162 to crank arm 164. Arm 164 is in turn pivotally mounted by pin 166 to side frame 122. The opposite end of arm 166 is connected by pin 168 to link 170, which is in turn pivotally connected to pin 172 extending from the side wall of heater 86.

Pin 172 is further engaged with curved slot 174 defined within side frame 122. Thus, retraction of actuator 160 into cylinder 158 rotates crank arm 164 and moves link 170 to push pin 172 to the uppermost end of curved slot 174. Heater 86 further is provided at its opposite end with a ramp surface 176 that rests upon a cam surface 178 of end wall 180 that extends between side frames 120 and 122. As a result, heater 86 is supported in a raised position.

As can be seen by reference back to FIG. 6, a second crank arm 164 and link 170 are provided for pivotal attachment by pin 156 and cooperation with curved slot 174, respectively, of side frame 120. Thus, the end of heater 86 closest to conditioning station 55 is supported on both sides by links 170 connected to pins 172. It should be noted that in FIG. 6 actuator 160 of air cylinder 158 is shown connected to the crank arm associated with side frame 120, while in FIGS. 7 and 8, actuator 160 is shown connected to the crank arm 164 associated with side frame 122. In practice, of course, actuator 160 may be connected to either of crank arms 164, or may be connected to both, such as by connection of actuator 160 to some linkage extending between the lower ends of the crank arms 164. In the preferred embodiment, actuator 160 is connected to the crank arm associated with side frame 122, so that air cylinder 158 may be conveniently mounted to the main frame of the printing apparatus.

Referring again to FIG. 7, frame 126 of transport mechanism 124 may be seen has having side walls 182 (only one shown) and transverse walls 184 and cover 186 for defining a housing for vacuum plenum 118. Plenum 118 is carried within the housing defined by frame 126, and includes upper portion 188 and orifice plate 190. A vacuum supply inlet 192 is mounted to side wall 182 of frame 126, and communicates with the interior of plenum 118 through opening slot 194. Thus, vacuum supplied to the interior of plenum 118 through inlet 192 is provided at the series of orifices 196 provided in plate 190.

Plenum 118 is placed within the housing defined by frame 126 for free movement in the vertical direction. When heater 86 is in its uppermost position, as shown in FIG. 7, a series of cams 198 carried at the outer edges of the convex surface 88 of heater 86 engage the outer edges of orifice plate 190 so as not to contact belts 44. Similarly, cams 200 engage transverse wall 184 of frame 126, thereby pivoting the entire transport mechanism 124 slightly upwards about shaft 128. As as result, the convex surface 88 of heater 86 is pressed against belts 44 to make certain that sheets carried across surface 88 by belts 44 are kept in close contact with heater 86, although such force is not so great as to interfere with the transporation of sheets by belts 44.

The heating station 50 is shown in its deactivated state in FIG. 8. As has been noted, only certain sheets will require heating and conditioning following printing, and thus, for sheets that do not require heating, heater 86 will be retracted and the power supply thereto may be temporarily discontinued. Even when heater 86 is in its raised position, however, it is not necessary that it be continuously energized. Since roller pairs 90, 92 and 94 will act as a heat sink and retain some heat from sheets previously passing therethrough, it may be possible to reduce or temporarily discontinue powering of heater 86 even when sheets are being flattened.

Heater 86 is lowered to the position shown in FIG. 8 by extension of actuator 160 from air cylinder 158. This pivots crank arm 164 about pin 166, which in turn causes link 170 to move pin 172 downwardly along curved slot 174. Ramp surface 176 of heater 86 continues to rest on cam surface 178 of end wall member 180 (althouch range surface 176 has been moved therealong), and heater 86 is lowered to the position shown in FIG. 8.

As a result of lowering of heater 86 to its lowered position, cams 200 on surface 88 release frame 126 and permit the transport mechanism 124 to pivot about shaft 128 to its fully lowered position. In addition, cams 198 release vacuum plenum 118, which lowers into contact with belts 44. Since vacuum is still applied to the interior of plenum 118 through inlet 192, vacuum is now supplied through orifices 196 in plate 190 and through openings (not shown) in belts 44 to paper sheets supplied to belts 44. The vacuum causes the sheets to adhere to belts 44, which carry the sheets along transport mechanism 124 for delivery to conditioning station 155.

The conditioning station 55 may be seen in detail by reference to FIGS. 6, 9 and 10. As has been noted, rollers 90a, 92a, and 94a of roller pairs 90, 92 and 94 are carried within upper frame 96, while rollers 90b, 92b and 94b of each roller pair are carried within lower frame 98, which is defined by side frames 120 and 122 and transverse member 202. Specific details regarding roller pairs 90, 92, and 94 may be seen by reference to FIGS. 4 and 4A, and the accompanying description, with such details having been omitted from FIG. 9 for clarity.

Depending upon whether sheets passing between the roller pairs are to be laterally stretched, the compressive forces between the individual rollers of the roller pairs is varied between a relatively high force and a relatively low force. The means for achieving this variation is best seen from FIGS. 9 and 10. A conditioning station cover 204 is disposed above frame 96, and is pivotally mounted by pin 206 at its rear end to side frame 122. A shaft 208 is mounted for rotation at the forward end of cover 204, supported by roller bearings 210. Shaft 208 includes an eccentric portion 212 between the portion of shaft 208 carried within cover 204 and its outer end. A crank 214 is securely mounted to the forward end of shaft 208.

Crank 214 is pivotally mounted by pin 216 to yoke 218, which is in turn connected to an actuator 220 of air cylinder 222. Air cylinder 222 is mounted by bracket 224 to cover 204, so that extension and retraction of actuator 220 pivots crank 214 and rotates shaft 208 within cover 204. A latch member 226 having a central bore is carried on eccentric portion 212 of shaft 208, and extends downwardly, being retain in its downward orientation by retaining pin 228. Because latch member 226 is carried on the eccentric portion 212 of shaft 208, rotation of shaft 208 by air cylinder 222 results in vertical movement of latch member 226.

Latch member 226 cooperates with an upwardly extending catch 230 mounted within a sleeve housing 232. Housing 232 is pivotally connected to bracket 234, which is in turn mounted to side frame 120. Housing 232 is movable between a latching and an unlatched position, and is biased by spring means 236 into the latching position. When so positioned, catch 230 engages latch 226 to secure cover 204 in its lowered position. Upon movement of housing 232 to its unlatched position, catch 230 release latch 226, and cover 204 is free to be moved to a raised position for access to the roller pairs of conditioning station 55. It will be noted that both latch 226 and catch 230 are provided with ramp surfaces so that housing 232 need not be manually moved to its unlatched position upon lowering of cover 204.

As has been noted, actuation of air cylinder 222 causes catch 226 to be moved upwardly and downwardly as a result of catch 226 being carried on and rotatable about eccentric portion 212 of shaft 208. Thus, when latch 226 is engaged with catch 230, it can be seen that actuation of air cylinder 222 has the result of either drawing cover 204 downwardly toward frame 98 or permitting cover 204 to move slightly upwards from frame 98.

Frame 96 is positioned beneath cover 204 and maintained in relative positioned by a plurality of pins 238 (only one shown) mounted to frame 96 and positioned within bores in the underside of cover 204. Frame 96 is attached to cover 204 by springs 240 connected therebetween, which are provided with sufficient tension to hold frame 96 beneath cover 204 as the cover is moved to a raised position to permit access to the paper path, but which do not have sufficient tension to produce any lifting movement in frame 96 when cover 204 is in its lowered positioned.

A projection 242 extends upwardly from the upper surface of frame 96 and includes a recess 244 centrally formed therein. A downward projection 246 extends from the underside of cover 204, and includes a cooperating central recess 248. A spherical metal bearing 250 is placed within the cooperating recesses 244 and 248, and provides the sole point of rigid contact between cover 204 and frame 96. Thus, downward movement of cover 204 caused by actuation of air cylinder 222 results in compresssive force being exerted upon frame 96 through bearing 250. Due to the central location of bearing 250 with respect to frame 96, the compressive forces are evently distributed thereacross, with springs 240 further aiding in balancing such forces. As a result, air cylinder 222 causes the variation in compressive forces between rollers 90a, 92a and 94a carried in frame 96 and rollers 90b, 92b and 94b carried in frame 98. These forces may be varied between relatively low, when sheets having insufficient ink coverage to require stretching are passed through conditioning station 55, and relatively high, when the sheets require application of stretching forces to prevent curling.

While the methods herein described, and the form of apparatus for carrying these methods into effect, constitute preferred embodiments of this invention, it is to be understood that the invention is not limited to these precise methods and form of apparatus, and that changes may be made in either without departing from the scope of the invention, which is defined in the appended claims:

What is claimed is:

1. A method for operating upon selected ones of a plurality of moving paper sheets for flattening of the selected sheets subsequent to the printing thereon with a liquid ink, comprising the steps of:

transporting the sheets sequentially along a transport path;

heating the selected sheets during transportation thereof along said transport path;

applying a stretching force to the selected sheets in a longitudinal direction with respect to the sheets during transportation thereof along said transport path; and applying a stretching force to the selected sheets in a lateral direction with respect to the sheets during transportation thereof along said transport path;

said heating of the selected sheets being performed at a first predetermined location along said transport path;

said heating of the selected sheets further being performed by a heater selectively movable between a first position remote from said transport path and a second position adjacent said first predetermined location and said transport path, and wherein said heating step includes:

moving said heater from said first position to said second position prior to transporation of a selected sheet past said first predetermined location;

in the event the next succeeding sheet of the moving sheets is a selected sheet, retaining said heater in said second position; and in the event the next succeeding sheet of the moving sheets is not a selected sheet, moving said heater from said second position to said first position.

2. A method for operating upon selected ones of a plurality of moving paper sheets for flattening of the selected sheets subsequent to the printing thereon with a liquid ink, comprising the steps of:

transporting the sheets sequentially along a transport path;

heating the selected sheets during transportation thereof along said transport path;

applying a stretching force to the selected sheets in a longitudinal direction with respect to the sheets during transportation thereof along said transport path; and applying a stretching force to the selected sheets in a lateral direction with respect to the sheets during transportation thereof along said transport path;

said heating of the selected sheets being performed at a first predetermined location along said transport path;

said application of said longitudinal stretching force and said lateral stretching force being performed on the selected sheets simultaneously and at a second predetermined location along said transport path;

said application of said lateral stretching force to the selected sheets being performed by:

applying compressive force to the selected sheets at said second predetermined location along said transport path, and converting said compressive force to said lateral stretching force;

said application of said compressive force to selected sheets being performed by a pair of oppositely-driven rollers disposed in selectively compressive mutual contact for movement of sheets therebetween along said transport path;

said application of said compressive force to selected sheets including:

mutually compressing said rollers to produce said compressive force therebetween prior to transportation of a selected sheet past said second predetermined location;

in the event the next succeeding sheet of the moving sheets is a selected sheet, maintaining said rollers in compression to produce said compressive force; and in the event the next succeeding sheet of the moving sheets is not a selected sheet, relieving compression between said rollers at least partially to produce at least substantially less than said compressive force between said rollers.

* * * * *